US012589724B2

(12) United States Patent
Prasanth et al.

(10) Patent No.: US 12,589,724 B2
(45) Date of Patent: Mar. 31, 2026

(54) SYSTEMS AND METHODS FOR CONTROLLING VEHICLE BRAKE SYSTEM COMPRESSORS

(71) Applicant: Transportation IP Holdings, LLC, Norwalk, CT (US)

(72) Inventors: Sunkara Prasanth, Bangalore (IN); Rajeev Verma, Bangalore (IN); Venkateswara Reddy Maram, Bangalore (IN); Vinay Ramu, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 224 days.

(21) Appl. No.: 18/194,798

(22) Filed: Apr. 3, 2023

(65) Prior Publication Data

US 2023/0331210 A1      Oct. 19, 2023

Related U.S. Application Data

(60) Provisional application No. 63/363,155, filed on Apr. 18, 2022.

(51) Int. Cl.
*B60T 17/22* (2006.01)
*B60T 13/45* (2006.01)

(52) U.S. Cl.
CPC ............ *B60T 17/221* (2013.01); *B60T 13/45* (2013.01); *B60T 2270/402* (2013.01); *B60T 2270/406* (2013.01)

(58) Field of Classification Search
CPC .. B60T 17/221; B60T 13/45; B60T 2270/402; B60T 2270/406; B60T 17/02; B60T 13/26; F04B 49/065
See application file for complete search history.

(56) References Cited

U.S. PATENT DOCUMENTS

| | | | |
|---|---|---|---|
| 2006/0168958 A1* | 8/2006 | Vetrovec ................... | F04F 5/18 60/599 |
| 2007/0044551 A1* | 3/2007 | Fogelstrom ........... | B60T 17/221 73/121 |
| 2022/0063574 A1* | 3/2022 | Potter ................... | B60T 13/665 |
| 2022/0355780 A1* | 11/2022 | Oswald ................... | B60T 17/04 |
| 2022/0393206 A1* | 12/2022 | Arya ................ | H01M 8/04126 |
| 2024/0026874 A1* | 1/2024 | Ren ......................... | F04B 49/06 |

FOREIGN PATENT DOCUMENTS

| | | | | |
|---|---|---|---|---|
| CN | 115285097 A | * | 11/2022 | ............ B60T 13/365 |
| EP | 1757506 A1 | * | 2/2007 | ............. B60T 17/02 |
| WO | WO-2017021403 A1 | * | 2/2017 | ............. B60T 17/02 |
| WO | WO-2017139822 A1 | * | 8/2017 | |
| WO | WO-2021053524 A1 | * | 3/2021 | ......... B60H 1/00371 |

* cited by examiner

*Primary Examiner* — Joseph J Dallo
(74) *Attorney, Agent, or Firm* — K&L Gates LLP

(57) ABSTRACT

Systems and methods control operation of multiple compressors of a multi-compressor assembly on a vehicle. A controller determines a leak rate of a brake system of a vehicle. The controller changes a pressure threshold at which one or more compressors are activated to supply gas to the brake system based on the leak rate. The controller activates at least a first compressor of the one or more compressors to increase a gas pressure of the brake system based on the gas pressure of the brake system falling below the pressure threshold that is changed.

20 Claims, 7 Drawing Sheets

SYSTEMS AND METHODS FOR CONTROLLING VEHICLE BRAKE SYSTEM COMPRESSORS

CROSS-REFERENCE TO RELATED APPLICATIONS

This application claims priority to U.S. Provisional Patent Application No. 63/363,155, which was filed on 18 Apr. 2022, and the entire disclosure of which is incorporated herein by reference.

BACKGROUND

Technical Field

The subject matter described herein relates to compressors that pressurize gas for vehicle pneumatic brake systems.

Discussion of Art

Some vehicles have pneumatic brake systems that use pressurized gas to apply friction brakes against rotating elements to slow movement of the vehicle. A brake pipe of the brake system is charged with compressed air (or another gas) by one or more compressors onboard the vehicle. If the vehicle is one of multiple interconnected vehicles of a vehicle system, such as a rail-based train, the brake pipe may continuously extend along multiple interconnected vehicles. The compressed air may provide the pneumatic brake force for applying friction brakes, as well as serve as a communication link through which the friction brakes are controlled to apply and release based on the pressure in the brake pipe. For example, a brake application may be triggered by venting air from the brake pipe, referred to as a brake pipe reduction. The brake pipe reduction may cause a differential at a brake valve and air pressure within a reservoir onboard each corresponding vehicle. Based on the differential, the brake valve may supply compressed air from the reservoir to a brake cylinder which applies the friction brakes. The brakes may be released by supplying compressed air to the brake pipe to raise the pressure in the brake pipe. When the air pressure in the brake pipe is greater than the air pressure in the reservoir, the brake valve may be designed to release the compressed air from the brake cylinder, which withdraws the friction brakes. The pressure within the brake pipe may be controlled by cycling the compressor to ensure that there is sufficient compressed air for effective brake applications and efficient, quick transitions between brake applications and withdrawals.

Known systems may control the same compressor to operate over and over on repeated loading cycles. The strain on the compressor may excessively wear the compressor components, reducing the operating lifetime of the compressor before performing maintenance on the compressor or replacing the entire compressor. Furthermore, if the wear causes the compressor to fail during a trip, the brake system may be inoperable. The vehicle may be stranded until maintenance can be performed to fix the compressor and ensure operability of the brake system. It may be desirable to have a system and method that differs from those that are currently available.

BRIEF DESCRIPTION

In one or more embodiments, a method is provided that includes determining a leak rate of a brake system of a vehicle, and changing a pressure threshold at which one or more compressors are activated to supply gas to the brake system based on the leak rate. The method includes activating at least one of the one or more compressors to increase a gas pressure of the brake system based on the gas pressure of the brake system falling below the pressure threshold that is changed.

In one or more embodiments, a system is provided that includes a controller configured to determine a leak rate of a brake system of a vehicle. The controller is configured to change a pressure threshold at which one or more compressors are activated to supply gas to the brake system based on the leak rate. The controller is configured to activate at least one of the one or more compressors to increase a gas pressure of the brake system based on the gas pressure of the brake system falling below the pressure threshold that is changed.

In one or more embodiments, a method is provided that includes monitoring a pressure of a brake system in a vehicle. Responsive to the pressure of the brake system falling below a lower pressure threshold, the method includes activating a first compressor of the brake system, and monitoring the pressure of the brake system after activating the first compressor. Responsive to the first compressor reaching a decreased operational state, the method includes activating at least a second compressor of the brake system, and monitoring the pressure of the brake system while both the first compressor and the at least the second compressor are active. The method includes unloading at least one of the first compressor or the at least the second compressor responsive to the pressure of the brake system reaching an upper pressure threshold.

In one or more embodiments, a system is provided that includes a multi-compressor assembly and a controller. The multi-compressor assembly includes a first compressor and at least a second compressor, and is configured to increase a pressure of a brake system in a vehicle. The controller is configured to monitor the pressure of the brake system, and to activate the first compressor of the multi-compressor assembly responsive to the pressure of the brake system falling below a lower pressure threshold. The controller is configured to continue monitoring the pressure of the brake system after activating the first compressor, and to activate the at least the second compressor of the brake system responsive to the first compressor reaching a decreased operational state. The controller is configured to continue monitoring the pressure of the brake system while both the first compressor and the at least the second compressor are active, and to unload at least one of the first compressor or the at least the second compressor responsive to the pressure of the brake system reaching an upper pressure threshold.

In one or more embodiments, a system is provided that includes a multi-compressor assembly and a controller. The multi-compressor assembly has a first compressor and a second compressor configured to be coupled with a brake system of a vehicle. The multi-compressor assembly includes a first contactor set configured to control contact between different groups of first poles of the first compressor and at least a first source of electric current that powers the first compressor. The multi-compressor assembly includes a second contactor set configured to control contact between different groups of second poles of the second compressor and at least the first source of electric current that powers the second compressor. The controller is configured to control the first contactor set and the second contactor set to change which of the groups of the first poles of the first compressor and which of the groups of the second poles of the second compressor are connected with the at least the first source of electric current based on an operational state of the vehicle.

In one or more embodiments, a method is provided that includes connecting a first group of first poles of a first compressor in a multi-compressor assembly with a first source of electric current to power the first compressor to increase a gas pressure in a brake system of a vehicle. The method includes monitoring an operational state of the vehicle, and connecting a second group of second poles of a second compressor in the multi-compressor assembly with the first source of electric current to power the second compressor to increase the gas pressure in the brake system of the vehicle based on a change in the operational state of the vehicle.

In one or more embodiments, a method is provided that includes monitoring one or more of a lubricant temperature or an operating duration of a first compressor and of a second compressor in a multi-compressor assembly of a vehicle. The method includes deactivating the first compressor or the second compressor responsive to the one or more of the lubricant temperature or the operating duration of the first compressor or the second compressor exceeding an associated non-zero threshold while another of the first compressor or the second compressor remains active.

In one or more embodiments, a system is provided that includes a controller configured to monitor one or more of a lubricant temperature or an operating duration of a first compressor and of a second compressor in a multi-compressor assembly of a vehicle. The controller is configured to deactivate the first compressor or the second compressor responsive to the one or more of the lubricant temperature or the operating duration of the first compressor or the second compressor exceeding an associated non-zero threshold while another of the first compressor or the second compressor remains active.

BRIEF DESCRIPTION OF THE DRAWINGS

The subject matter may be understood from reading the following description of non-limiting embodiments, with reference to the attached drawings, wherein below.

DETAILED DESCRIPTION

Figure 1:
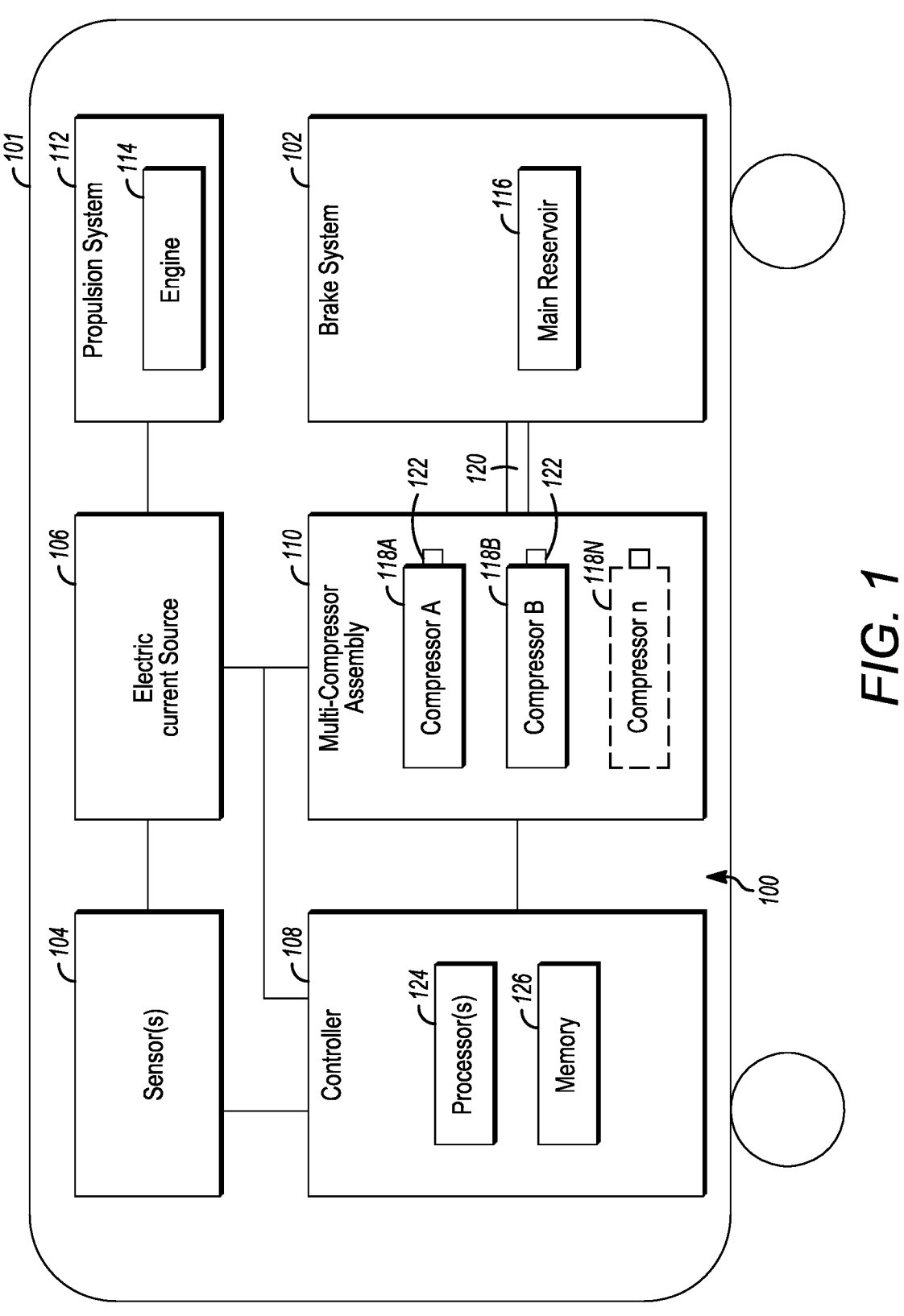
FIG. 1 is a schematic block diagram of a compressor control system disposed onboard a vehicle according to an embodiment.

Embodiments of the subject matter described herein relate to a system and method for controlling compressors on a vehicle. The compressors may be components of a brake system operable to slow movement and/or maintain a stationary position of the vehicle. The system is referred to herein as a compressor control system. The compressor control system includes two or more compressors. Each of the compressors is independently operated. For example, a controller of the compressor control system may selectively activate a first compressor to begin loading, or compressing gas, without activating a second compressor of the system. The controller may subsequently unload the first compressor without necessarily unloading the second compressor during the same time period. The term load is used synonymously with activate herein, and the term unload is used synonymously with deactivate. A compressor that is unloading may produce no compressed gas. The compressors may have respective unloader valves that are independently controlled by the controller. The controller may unload a first compressor by generating a control signal to open the unloader valve of the first compressor. The compressor may draw some electrical power when in the unloading or unloaded state, although the compressor draws more electrical power when in the loading state, producing compressed gas for the brake system.

The compressor control system described herein is designed to enable efficient operation of the brake system and extend the operating lifetime of the compressors relative to known systems. For example, the controller may employ control strategies to achieve a generally balanced duty cycle between the compressors (as opposed to operating one compressor more often and/or longer than other compressors). The balanced duty cycle may reduce the strain on the compressors, which may reduce maintenance frequency and costs, and extend the compressor operational lifetimes. Furthermore, if one compressor fails due to malfunction, damage, or the like, the controller may operate another compressor of the multi-compressor system in a back-up role to avoid brake failure. Operating the back-up compressor may allow continued movement of the vehicle, at least temporarily, until the vehicle can get to a safe stopping location that does not disrupt other vehicles and the compressor failure can be remedied.

While one or more embodiments are described in connection with rail vehicles, such as locomotives, not all embodiments are limited to rail vehicles. Unless expressly disclaimed or stated otherwise, the subject matter described herein extends to other types of vehicles, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

FIG. 1 is a schematic block diagram of a compressor control system 100 disposed onboard a vehicle 101 according to an embodiment. The vehicle includes the compressor control system, a brake system 102 for slowing and stopping movement of the vehicle along a route, a propulsion system 112 that generates tractive effort for propelling the movement of the vehicle, one or more sensors 104 for monitoring operating parameters of the vehicle and the components thereof, and an electric current source 106 for powering at least some of the components onboard the vehicle. The electric current source may be an alternator, an electrical energy storage device (e.g., a battery pack, capacitors, or the like), a fuel cell, and/or the like. In an embodiment, the electric current source is an auxiliary alternator. The auxiliary alternator may be discrete from a primary alternator that converts mechanical energy from an engine to electrical energy used to power one or more traction motors of the propulsion system. The illustrated components in FIG. 1 represent at least some vehicle components that relate to the compressor control system and the operations for controlling air compressors described herein. The vehicle may include additional components not shown in FIG. 1.

In an embodiment, the vehicle may be a rail vehicle. The rail vehicle may be a locomotive. In an alternative embodiment, the vehicle may be a different type of vehicle other than a rail vehicle, such as a highway truck (e.g., semi-truck), an automobile, a bus, an agricultural vehicle (e.g., mining truck, logging truck, etc.), a marine vessel, or another type of off-highway vehicle (e.g., a vehicle that is not legally permitted and/or are not designed for travel on public roadways).

The compressor control system includes a controller 108 and a multi-compressor assembly 110. The multi-compressor assembly includes at least two compressors 118. For example, the multi-compressor assembly has a first compressor 118A, a second compressor 118B, and optionally at least a third compressor 118n. The optional third compressor is shown in phantom in FIG. 1. Optionally, the compressors may have a similar construction as one another. For example, the first compressor may be a copy or replica of the second compressor. In an embodiment, the compressors are screw compressors. For example, the compressors may be oil screw compressors that use a lubricant such as oil to reduce friction between components For example, oil may lubricate the interface between a screw and a piston of the respective compressor. In an embodiment, each compressor includes a respective unloader valve 122. The unloader valve is actuatable between first and second operational states. When the compressor is active, actuation of the unloader valve to a first state may interrupt and cut-off power supply from the electric current source to a motor of the compressor. Actuation of the unloader valve may release residual air from a compression chamber and relative lines of the compressor when the motor turns off. The unloader valve in the second state may reestablish the conductive connection to the electric current source and may block a release vent/port of the compressor.

In an alternative embodiment, the compressors may be oil-free and/or may be other than screw compressors. For example, the compressors may be piston-type compressors, centrifugal compressors, or the like, as opposed to screw compressors. Optionally, at least some of the compressors of the multi-compressor assembly may be of different type from one another. For example, the first compressor may be an oil screw compressor, and the second compressor may be a centrifugal compressor.

The electric current source 106 may supply electric current to power operations of the sensor(s), the controller, and/or the multi-compressor assembly. The propulsion system may include a combustion engine 114. The propulsion system may include additional components, such as one or more traction motors, inverters, alternators, and the like. The brake system may be a pneumatic brake system that applies friction brakes to slow rotating elements (e.g., wheels, axles, etc.) based on the force of compressed gas. The brake system may include a main reservoir 116 connected to the multi-compressor assembly via one or more brake pipes 120. The main reservoir stores compressed gas, such as compressed air, received from the multi-compressor assembly.

The controller is operably connected to the multi-compressor assembly. The controller may generate control signals that are communicated, via wired and/or wireless communication pathways, to the multi-compressor assembly to control operations of the compressors. For example, the controller may control the duty cycle of each of the compressors. The duty cycle includes the times that the compressor is active and compressing gas (e.g., loaded), and the times that the compressor is inactive (e.g., unloaded). As described herein, the controller may independently control the operation of the compressors. For example, the controller may provide coordinated control of the unloader valves of the individual compressors. The controller may be operably connected to the one or more sensors and the electric current source via wired and/or wireless communication pathways. For example, the one or more sensors may generate sensor data (e.g., measurements) that represent operating parameters of the brake system, the engine, the multi-compressor assembly, or the like, and the controller may receive and analyze the sensor data. The controller may control operation of the multi-compressor assembly based on the analysis of the sensor data and programmed instructions.

The controller represents hardware circuitry that includes and/or is connected with one or more processors 124 (e.g., one or more microprocessors, integrated circuits, microcontrollers, field programmable gate arrays, etc.). The controller may include and/or is connected with a tangible and non-transitory computer-readable storage medium (e.g., memory) 126. The memory may store programmed instructions (e.g., software) that is executed by the one or more processors to perform operations of the controller described herein. For example, the controller may respond to stimulus, such as sensor data generated by the sensor(s), according to the programmed instructions. The memory may store additional information, such as a record of the activity of the compressors as controlled by the controller.

In the illustrated embodiment, the compressor control system is disposed onboard the vehicle. For example, all of the compressors of the multi-compressor assembly may be disposed onboard the same vehicle. In an alternative embodiment, the controller is disposed off-board the vehicle. The controller may be located remote from the vehicle at a dispatch facility, a data center that houses computer systems (e.g., servers), or the like. When the controller is remote from the power supply system, the sensor data that monitors one or more operating parameters of the power supply system may be remotely transmitted to the controller via a communication device.

Figure 2:
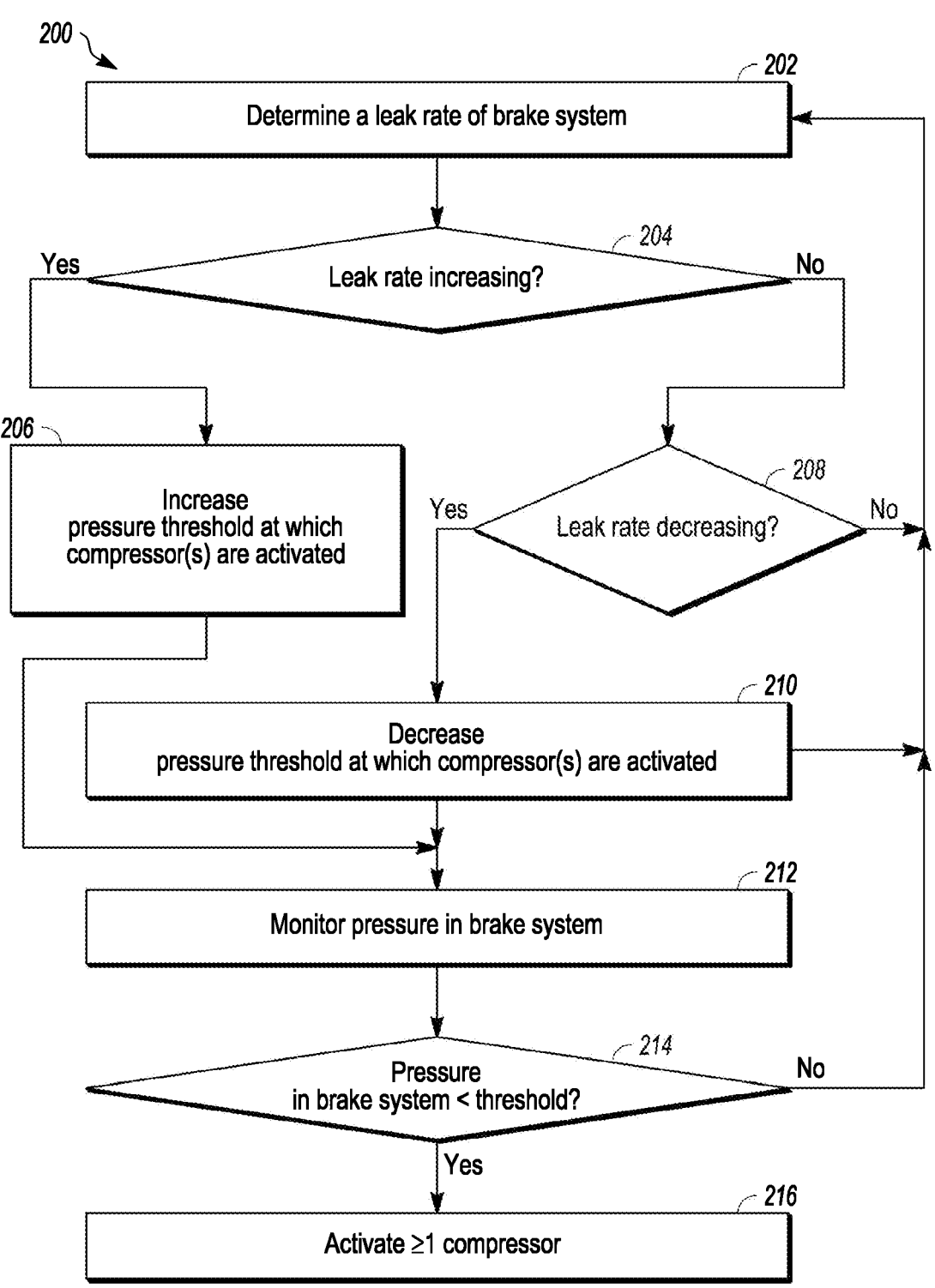
FIG. 2 is a flow chart of a method for changing a pressure threshold at which one or more compressors are activated according to an embodiment.

FIG. 2 is a flow chart 200 of a method for changing a pressure threshold at which one or more compressors are activated according to an embodiment. The one or more compressors may be the compressors of the multi-compressor assembly shown in FIG. 1. The method may be performed in whole or at least in part by the controller of the compressor control system shown in FIG. 1.

At step 202, a leak rate of a brake system of a vehicle is determined. The brake system may be the brake system of the vehicle shown in FIG. 1. The leak rate may be monitored by determining a pressure drop that occurs within the brake system. For example, the controller may determine a first gas pressure of the brake system at a first time based on first sensor data generated by one or more sensors. The first sensor data may be generated by a pressure sensor disposed within the brake system. The controller may determine a second gas pressure of the brake system at a second time, which is subsequent to the first time. The second gas pressure may be determined based on second sensor data generated by the same one or more sensors (e.g., pressure sensor) that generated the first sensor data. For example, the first and second gas pressures may represent gas pressures at the same location of the brake system, and at different times. The controller may compare the first gas pressure to the second gas pressure. A drop in the gas pressure from the first gas pressure to the second gas pressure, which is unrelated to a brake application or venting of the brake system, may be classified as a leak. The amount of the pressure drop relative to the time period that elapsed between the generation of the first and second sensor data may represent the leak rate.

In another example, the leak rate may be determined based on pressure measurements at two different locations in the brake system, where the measurements are generated at approximately the same time. For example, a first location may be at or near the compressor(s), and a second location may be closer to the friction brakes. The controller may determine a difference between the pressure at the first location and the pressure at the second location. The controller may estimate a portion of the pressure drop associated with inherent frictional resistance within the pipe, and may determine the leak rate based on the remaining portion of the calculated pressure drop. In another embodiment, the leak rate may be determined based on sensing of different parameters, other than pressure. The controller may monitor the leak rate over time and store determined values of the leak rate in the memory.

In an embodiment, the controller changes a pressure threshold at which one or more compressors are activated to supply gas to the brake system based on the leak rate. The pressure threshold may be a lower, or minimum, threshold. When the gas pressure in the brake system falls below the lower threshold, the controller may activate at least one of the compressors of the multi-compressor assembly for the compressor(s) to begin supplying gas to the brake system. The supplied gas eventually increases the gas pressure in the brake system to a level that exceeds the lower threshold.

At step 204, it is determined whether the leak rate of the brake system is increasing. For example, if the leak rate determined during an earlier time or time period is less than the leak rate determined more recently, then the controller confirms that the leak rate is indeed increasing. An increasing leak rate indicates that the pressure in the brake system is dropping or reducing faster than before. If the controller determines that the leak rate is indeed increasing, flow continues to step 206. At step 206, the controller increases the pressure threshold at which the compressor(s) are activated (e.g., the lower threshold). For example, if the default lower threshold is 60 psi, the controller may increase the lower threshold above 60 psi based on the leak rate. The controller may increase the lower threshold to 65 psi, 70 psi, 75 psi, or the like, including intervening values. As a result, if the pressure of the brake system falls below the modified lower threshold, such as 70 psi, the controller will activate at least one compressor before the pressure of the brake system is allowed to fall to the default threshold of 60 psi or lower.

In an embodiment, the controller dynamically changes the pressure threshold over time based on the leak rate. As used herein, dynamically means that the controller may change the pressure threshold in real-time during operation of the vehicle based on updated values of the leak rate. The controller may change the pressure threshold based on a detected change in the leak rate over time. Optionally, there is not only one or two fixed, static values for the pressure threshold, but rather a multitude of possible values that the controller may select to be the pressure threshold. The controller may dynamically change the threshold along a sliding scale. The controller may select any integer pressure value within a designated range of pressures representing the scale. For example, the threshold may start at an initial value, such as 60 psi. If the leak rate is determined to increase at step 204, then the controller may increase the pressure threshold by one step amount. The step amount may be 2 psi, 5 psi, 10 psi, or the like. If the modified (e.g., updated) pressure threshold is 65 psi, the controller may increase the modified pressure threshold by another step amount at a later time if it is determined at step 204 that the leak rate has increased again. For example, the controller may increase the pressure threshold to 70 psi.

If it is determined that the leak rate is not increasing, then flow continues to step 208 and it is determined whether the leak rate is decreasing. If the controller determines that the leak rate is decreasing over time, then flow continues to step 210 and the controller decreases the pressure threshold at which the compressor(s) are activated. For example, if the current pressure threshold is 70 psi, then the controller may reduce the threshold by one step amount along the sliding scale (e.g., to 65 psi). Optionally, the amount by which the controller increases the pressure threshold at step 206 and/or decreases the pressure threshold at step 208 may not be fixed step amounts. Rather, the amounts by which the pressure threshold is changed may be based on the extent or magnitude by which the leak rate changes. Quicker changes in the leak rate may trigger a greater size or magnitude of change in the pressure threshold, relative to slower changes in the leak rate.

Optionally, the amount by which the controller increases the pressure threshold at step 206 and/or decreases the pressure threshold at step 208 may be based on the offset between an updated, most recent value of the leak rate relative to an initial, default leak rate value. For example, the memory may store a look-up table that includes a list of leak rate values and a correlated list of pressure threshold values. Each leak rate value in the table has an associated pressure threshold value. The pressure threshold values in the table may gradually increase with increasing leak rates above the default leak rate value, and may gradually decrease with decreasing leak rates below the default leak rate value. In an embodiment, upon receiving or determining an updated value of the leak rate, the controller may access the look-up table and determine the pressure threshold value that is associated with the updated leak rate value. The controller may interpolate if the updated leak rate value is between two leak rates in the table and does not match any of the leak rates in the list. The controller determines the pressure threshold based on the information in the table and the updated leak rate value. Using the table, the controller may change the pressure threshold on a relatively frequent basis. For example, the controller may periodically update the pressure threshold based on changes in the leak rate, even which the vehicle is operating.

At step 212, the controller monitors the gas pressure in the brake system. The gas pressure may be determined based on sensor data generated by one or more sensors that monitor the brake system. For example, a pressure sensor may directly measure the gas pressure in the brake system. At step 214, the controller determines whether the gas pressure in the brake system is less than the pressure threshold that is changed. For example, the controller compares the gas pressure in the brake system, as measured, to the current lower pressure threshold (e.g., at the current value along the scale or range). The current lower pressure threshold may be the value set at step 206 or step 208, whichever is most recent. If the gas pressure in the brake system is less than the lower pressure threshold, then flow continues to step 216. At step 216, the controller activates at least one of the compressors of the multi-compressor assembly to supply gas to the brake system and increase the gas pressure of the brake system.

A technical effect of dynamically changing the pressure threshold based on leak rate may be increased brake system pressurization relative to systems that rely on a static pressure threshold. For example, if a relatively high leak rate is detected, then increasing the lower pressure threshold would result in the compressors being activated to charge (e.g., pressurize) the brake system at an earlier time than if the pressure threshold was set at a lower value. By starting to charge the brake system with the compressors earlier, the brake system is expected to reach a designated pressure level quicker. This may increase vehicle utilization by reducing the amount of time that the vehicle has limited use due to brake system charging.

Figure 3:
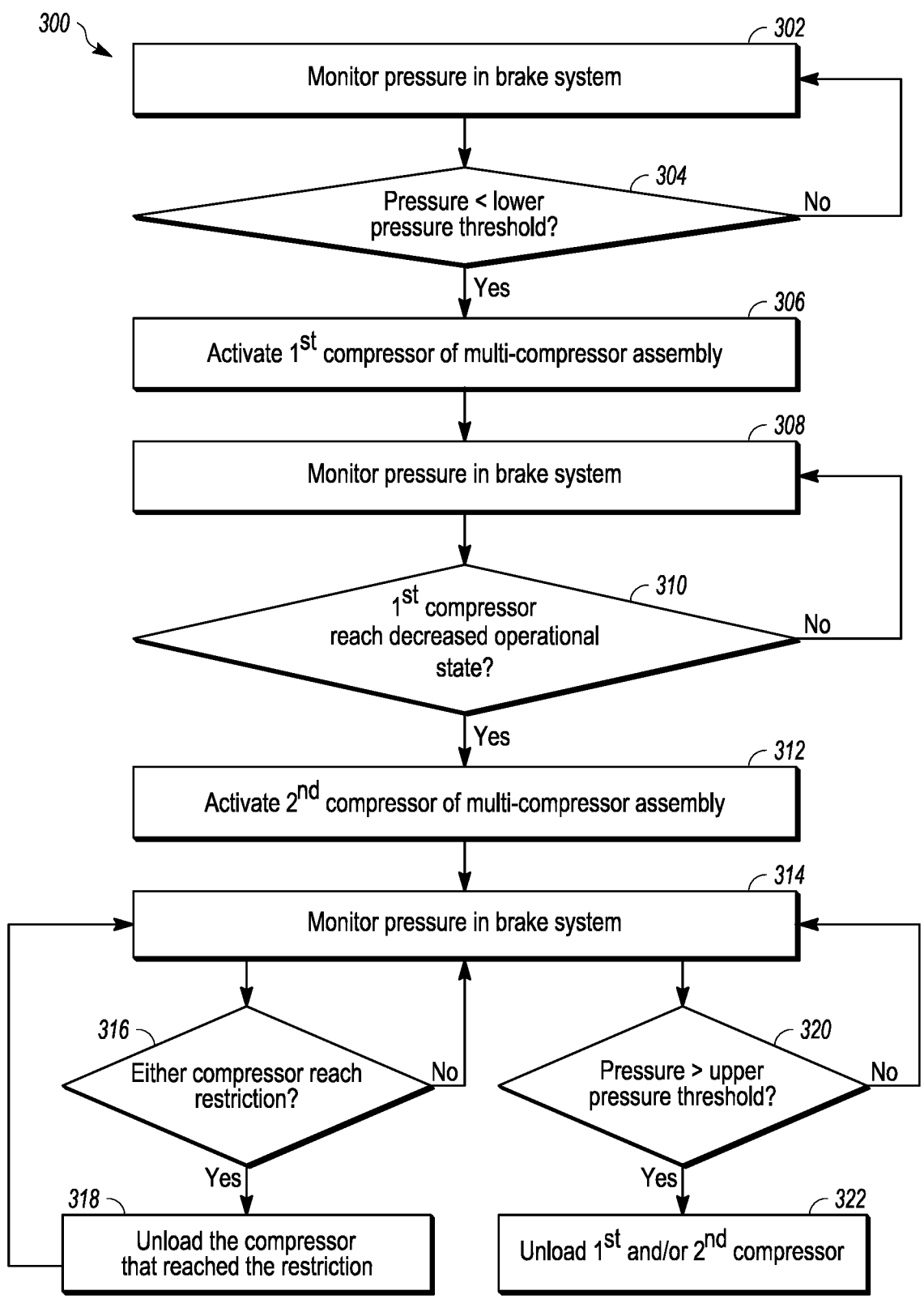
FIG. 3 is a flow chart of a method for controlling a multi-compressor assembly according to an embodiment.

FIG. 3 is a flow chart 300 of a method for controlling a multi-compressor assembly according to an embodiment. The multi-compressor assembly includes at least two compressors, and may be the multi-compressor assembly shown in FIG. 1. The method may be performed in whole or at least in part by the controller of the compressor control system shown in FIG. 1. The method in FIG. 3 may be combined with the method for changing a pressure threshold described in FIG. 2, or alternatively may be a discrete, independent process. For example, the method for controlling a multi-compressor assembly may include changing a lower pressure threshold based on a leak rate in the brake system, or alternatively the lower pressure threshold may be a fixed, static value.

At step 302, a gas pressure in a brake system is monitored. The controller may monitor the pressure in the brake system based on sensor data from the one or more sensors. For example, one or more pressure sensors may monitor the pressure in the brake system directly. Step 302 is similar to step 212 in FIG. 2. In an embodiment in which the method for controlling the compressors is combined with the method for changing the pressure threshold, the steps 302, 304, and 306 are equivalent to the steps 212, 214, and 216 in FIG. 2. For example, at step 304, it is determined whether the pressure in the brake system is less than a lower pressure threshold. The lower pressure threshold may represent a value that is dynamically changed by the controller based on a monitored leak rate in the brake system, such that the step 304 represents the step 214 in FIG. 2. Alternatively, the lower pressure threshold is a static value that does not change based on leak rate.

If the controller determines that the pressure in the brake system is indeed less than the lower pressure threshold, the controller activates a first compressor of the multi-compressor assembly. Right before activating the first compressor, the compressors of the multi-compressor assembly are inactive, such that the compressors do not supply compressed gas to the brake system. Upon activating the first compressor, the first compressor begins to generate compressed (e.g., pressurized) gas that is supplied to the brake system. The compressed gas increased the pressure in the brake system (assuming the flow rate of the compressed gas from the first compressor is greater than a rate of gas that leaks or escapes from the brake system). The controller does not activate the other compressor(s) of the multi-compressor assembly at this time. In an embodiment, the first compressor is one of the compressors that is at least temporarily designated as a primary or lead compressor. In an embodiment, the controller may switch (e.g., alternate) between different compressors taking the primary role for different loading cycles. The controller may switch between the compressors to balance the work load of the compressors and thereby reduce wear and maintenance and increase an operating lifetime of the compressors, relative to controlling one compressor to operate significantly more than another compressor. The step 306 may replace the step 216 in FIG. 2.

At step 308, the controller monitors the pressure in the brake system while the first compressor is active. For example, the controller may analyze sensor data generated subsequent to the first compressor starting to supply gas to the brake system to increase the gas pressure of the brake system.

At step 310, the controller determines whether the first second that is active has reached a decreased operational state. The decreased operational state may represent a reduced effectiveness of the first compressor at the task of increasing the gas pressure of the brake system, relative to an initial effectiveness of the first compressor at the task or relative to a designated reference level of effectiveness. For example, the controller may determine that the first compressor reaches the decreased operational state responsive to the pressure of the brake system decreasing while the first compressor is active. For example, if while monitoring the pressure in the brake system at step 308 the controller detects that the pressure has flattened and/or started to decrease over time, the controller may characterize that event as a decreased operational state of the first compressor. The event may indicate that the first compressor is not (e.g., no longer) able to increase the gas pressure in the brake system alone.

In another example, the controller may detect the decreased operational state in response to the pressure in the brake system failing to reach an upper pressure threshold within a designated, non-instantaneous period of time while only the first compressor is active. The upper pressure threshold may represent a target pressure in the brake system. The controller may start a timer after activating the first compressor. The controller may monitor the time and the brake system pressure as the first compressor is active. If the pressure in the brake system does not reach the upper pressure threshold within the designated period of time, according to the timer, then the controller determines that the first compressor is at the decreased operational state. The designated period of time may be on the order of minutes.

In another example, the controller may detect the decreased operational state in response to first compressor being continually active for a designated, non-instantaneous period of time. For example, the designated period of time may refer to an automated time-out period to protect the compressors from wear and damage as a result of excessive operation. There may be a leak in the brake system or an issue with the first compressor that would prevent the pressure in the brake system from reaching the upper threshold even if the first compressor continuously operates for days. The automated time-out may apply to prevent the compressors from such excessive operation. In this example, the controller may detect the decreased operational state based only on the time elapsed from the activation of the first compressor.

If the controller determines that the first compressor reached the decreased operational state, then flow proceeds to step 312. If not, flow returns to step 308 and the controller continues to monitor the pressure in the brake system. At step 312, the controller activates a second compressor of the multi-compressor assembly. The second compressor begins to supply gas to the brake system. The first and second compressors are concurrently active. Gas supplied by the second compressor may combine with gas supplied by the first compressor, which may increase the gas pressure in the brake system by a greater rate than prior to activating the second compressor with only the first compressor active. At step 314, the controller monitors the pressure in the brake system while both the first and second compressors are active. Although not depicted in the flow chart, the method may repeat step 310, particularly for multi-compressor assemblies that include three or more compressors. The repeated step 310 may ask if the first and second compressors have reached the decreased operational state. If so, then the controller may activate a third compressor to supply gas to the brake system in conjunction with the first and second compressors.

At step 316, the controller determines whether any of the active compressors have reached a restriction (e.g., restriction event). The restriction may be an operating constraint or limitation that is applied to prohibit excessive wear and damage to the compressor. One restriction may be the time-out described above. For example, upon activating each of the first and second compressors, the controller may use the timer to monitor the operating times of each of the compressors. The first compressor was activated prior to the second compressor, and will reach the time-out limit prior to the second compressor. Once the controller determines that the first compressor has been continuously operating for a period of time that reaches the time-out limit, then controller characterizes that event as the first compressor reaching a restriction. Another restriction event may be an internal temperature of the compressor reaching a threshold upper temperature limit, a power supply to the compressor reaching a threshold power supply limit, or the like. The restriction may occur while the pressure in the brake system is less than the upper pressure threshold. The controller may independently monitor to determine whether any of the active compressors reach a restriction. If at least one compressor reaches the restriction, flow proceeds to step 318. At step 318, the controller unloads the compressor that reached the restriction. The controller may unload the compressor by deactivating the compressor. For example, the controller may actuate the unloader valve of the compressor. The controller may open the unloader valve to actuate the unloader valve. Unloading the compressor blocks that compressor from supplying additional gas to the brake system. For example, if the controller unloads the first compressor, then the first compressor ceases supplying gas while second compressor continues to supply gas to the brake system. The flow may return to step 314 for the controller to continue monitoring the pressure in the brake system.

Separately, as the controller monitors the pressure in the brake system, the controller may determine at step 320 whether the pressure in the brake system exceeds the upper pressure threshold. If the pressure does not exceed the upper threshold, the controller continues to monitor the pressure in the brake system at step 314. Upon the controller determining that the pressure exceeds the upper pressure threshold, the flow proceeds to step 322. At step 322, the controller may unload at least one of the active compressors to reduce the amount of gas the is supplied to the brake system. The controller may unload a compressor by actuating the unloader valve of the respective compressor. In an embodiment, the controller may concurrently unload all active compressors, such as both the first and second compressors described above. In another embodiment, the controller may unload all but one active compressor. The controller may reduce a power setting of the remaining active compressor to reduce the amount of gas supplied to the brake system, while maintaining the compressor in an active state that supplies a non-zero amount of gas. After step 322, the flow may return to the beginning at step 302.

The method described above may represent one loading cycle for the brake system. For the next loading cycle, the controller may switch roles of the compressors to balance the duty cycles of the compressors. For example, the controller may activate the second compressor first at step 306, and activate the first compressor at step 312. The controller may alternate compressors for each loading cycle. Optionally, if one of the compressors experiences damage or a malfunction, the controller may select a different compressor for the primary compressor that is activated first, even if it is the turn of the damaged/malfunctioning compressor to be the primary compressor. Optionally, the controller may select which compressor is the primary compressor that is activated first based on one or more parameters of the compressors, such as oil temperature. If the temperature of oil in one compressor is below a lower temperature threshold, the controller may select that compressor to be the primary compressor in the next loading cycle in order to heat the oil, which may prohibit degradation of the oil. Furthermore, if the temperature of the oil of one compressor is above an upper temperature threshold, the controller may not select that compressor to be the primary compressor until the oil temperature has retreated into a desired temperature range between the upper and lower thresholds.

Figure 4:
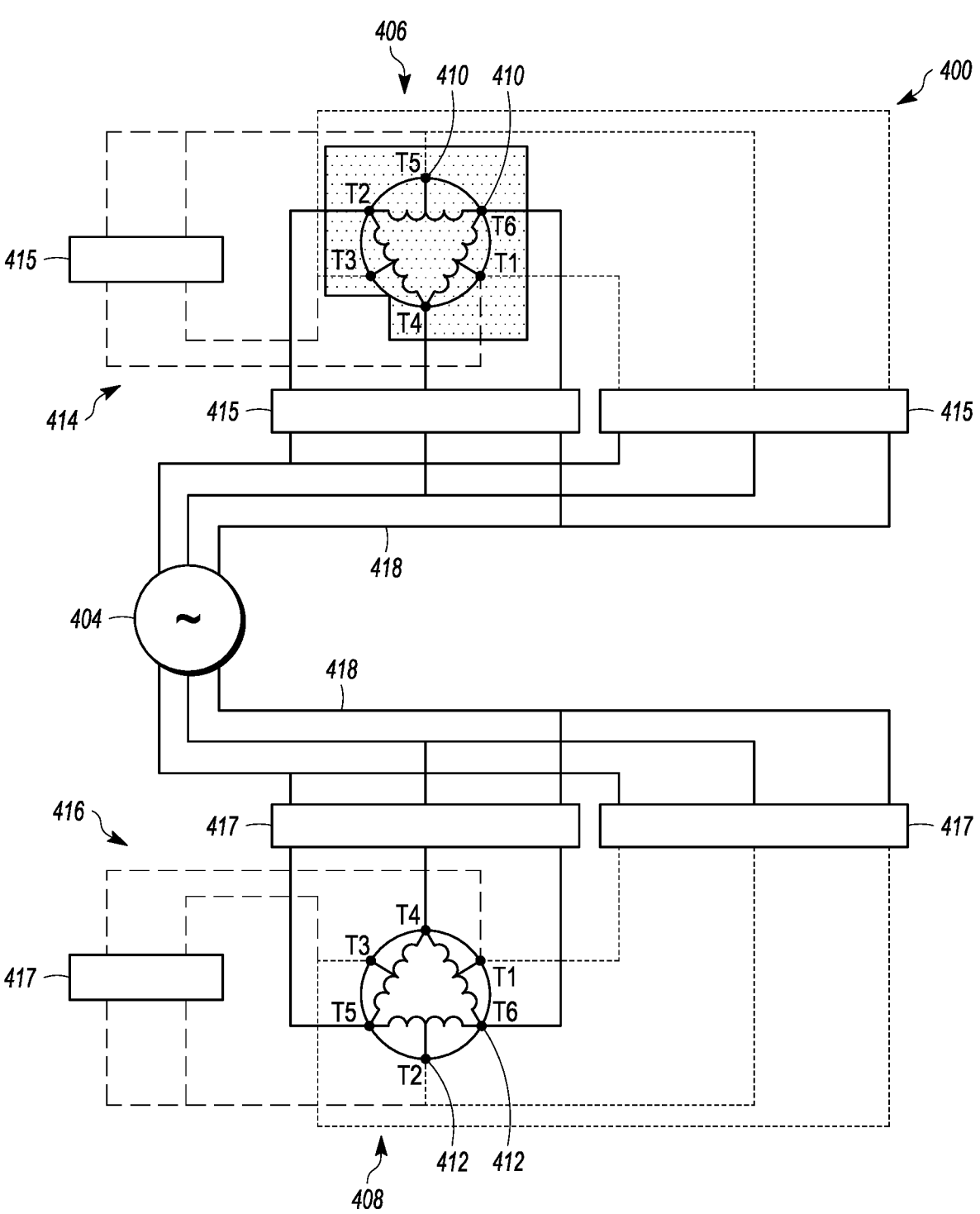
FIG. 4 is a diagram illustrating a multi-compressor assembly and an electric current source according to an embodiment.

FIG. 4 is a diagram illustrating a multi-compressor assembly 400 and an electric current source 404 according to an embodiment. The multi-compressor assembly may be the multi-compressor assembly shown in FIG. 1. The electric current source may be the electric current source shown in FIG. 1. The multi-compressor assembly includes a first compressor 406 and a second compressor 408 which are designed for connection to a brake system of a vehicle. The multi-compressor assembly optionally may include more than two compressors. The first compressor may include multiple first poles 410. The second compressor may include multiple second poles 412. The poles of the compressors may be electrically conductive nodes and/or lines that receive electrical power for powering the respective compressors. Different groups of the poles of the first compressor may be connected to the electric current source based on the state of the first set of the contactors to establish different pole configurations or settings of the first compressor. Likewise, different groups of the poles of the second compressor may be connected to the electric current source based on the state of the second set of the contactors to establish different pole configurations of the second compressor. The poles may be connected to the electric current source via wire elements 418. The wire elements may be wires, metal circuit lines, or the like. In an embodiment, each of the compressors is operable in a first pole configuration and a second pole configuration, where a first group of the poles is connected to the electric current source in the first pole configuration, and a second group of the poles is connected to the electric current source in the second pole configuration. The poles in the first group may be separate and discrete from the poles in the second group.

In an embodiment, the multi-compressor assembly includes a first contactor set 414 of multiple electrical contactors 415. The first contact set may control contact between different groups of the first poles of the first compressor and the electric current source. The multi-compressor assembly may include a second contactor set 416 of multiple electrical contactors 417. The contactors may be electromechanical switch devices. Optionally, the multi-compressor assembly may include solid state switches or other types of switch devices instead of, or in addition to, the contactors. The second contact set may control contact between different groups of the second poles of the second compressor and the electric current source. The electric current source may be connected to both of the compressors, such that the electric current source may power both compressors. In an embodiment, the electric current source is an alternator. In an alternative embodiment, the electric current source may power only one compressor, and the other compressor may be powered by a different electric current source. The state of the contactors in the first and second sets may control which of the compressors is powered by the electric current source at any given time.

In an embodiment, the electric current source and the multi-compressor assembly are components of a compressor control system, which also includes a controller. The compressor control system may be the compressor control system shown in FIG. 1, such that the controller is the controller shown in FIG. 1. The controller may be operably connected to the contactors in the first and second sets and controls the conducting or non-conducting states of each of the contactors. For example, the controller may generate electrical control signals that are conveyed via wired or wireless communication pathways to the contactors to selectively open (e.g., break conduction) and close (e.g., establish conduction) through each of the contactors.

In an embodiment, the controller operates the first and second sets of contactors according to a pole change strategy. The pole change strategy may avoid damage caused by frequent switching of compressor contactors in different pole configurations or settings. The different pole configurations may occur based on an operational state of the vehicle. In an embodiment, the controller controls the first contactor set and the second contactor set to change which of the groups of the first poles of the first compressor and which of the groups of the second poles of the second compressor are connected with the electric current source based on the operational state of the vehicle. For example, when the vehicle is in a first operational state, the controller may control the first set of contactors to connect the first compressor to the electric current source to enable the first compressor to be powered by the electric current source. The first compressor may be connected to the electric current source in a first pole configuration (e.g., through a first group of the first poles). In response to a change in the operational state of the vehicle, the controller may control the first contactor set to change the pole configuration of the first compressor by changing the group of poles that is connected to the electric current source. Alternatively, the controller may control the first contactor set to disconnect the first poles from the electric current source to block the first compressor from receiving power from the electric current source, at least temporarily. The controller may control the second contactor set for selecting and changing the pole configurations of the second compressor in a similar and independent manner as the controller controls the first contactor set.

In an embodiment, the operational state of the vehicle is engine speed (e.g., a speed of the engine of the vehicle shown in FIG. 1). The engine speed may be measured by one of the sensors operably connected to the controller. As the engine speed is determined to increase, the controller may change which of the groups of the first poles of the first compressor and which of the groups of the second poles of the second compressor are connected with the electric current source. For example, a first group of the first poles and a first group of the second poles may be designed for low engine speeds. A second group of the first poles and a first group of the second poles may be designed for higher engine speeds. As the engine speed surpasses a threshold speed, the controller may actuate the first contact set and/or the second contact set to switch from the respective first group of the poles to the second group of the poles.

In another example, the first compressor may be designed for operation at low engine speeds, and the second compressor may be designed for operation at higher engine speeds. The controller may actuate the first contact set to connect at least one group of the first poles of the first compressor with the electric current source while the engine speed is below a threshold speed. In response to the engine speed increasing (e.g., surpassing the threshold speed), the controller may control the first contactor set to disconnect the first poles of the first compressor from the electric current source and may control the second contactor set to connect at least a group of the second poles of the second compressor with the electric current source. The controller may continue to monitor the engine speed. In response to the engine speed decreasing (e.g., dropping below the threshold speed or a second threshold speed), the controller may actuate the first contactor set to reconnect at least a group of the first poles of the first compressor with the current source and disconnect the second poles of the second compressor from the current source.

The controller may stop operation the first compressor and replace with the operation of the second compressor, based on engine speed or another operational state of the vehicle, to allow the first compressor to undergo a pole change operation while not under load. For example, the controller may wait for a pressure in the first compressor to drop to or below a lower pressure threshold before restarting the first compressor after a pole change. Otherwise, a spark may occur that damages the contactors and/or other equipment. Connecting the second compressor allows the first compressor to safely undergo the pole change without a lapse in gas supply to the brake system.

Figure 5:
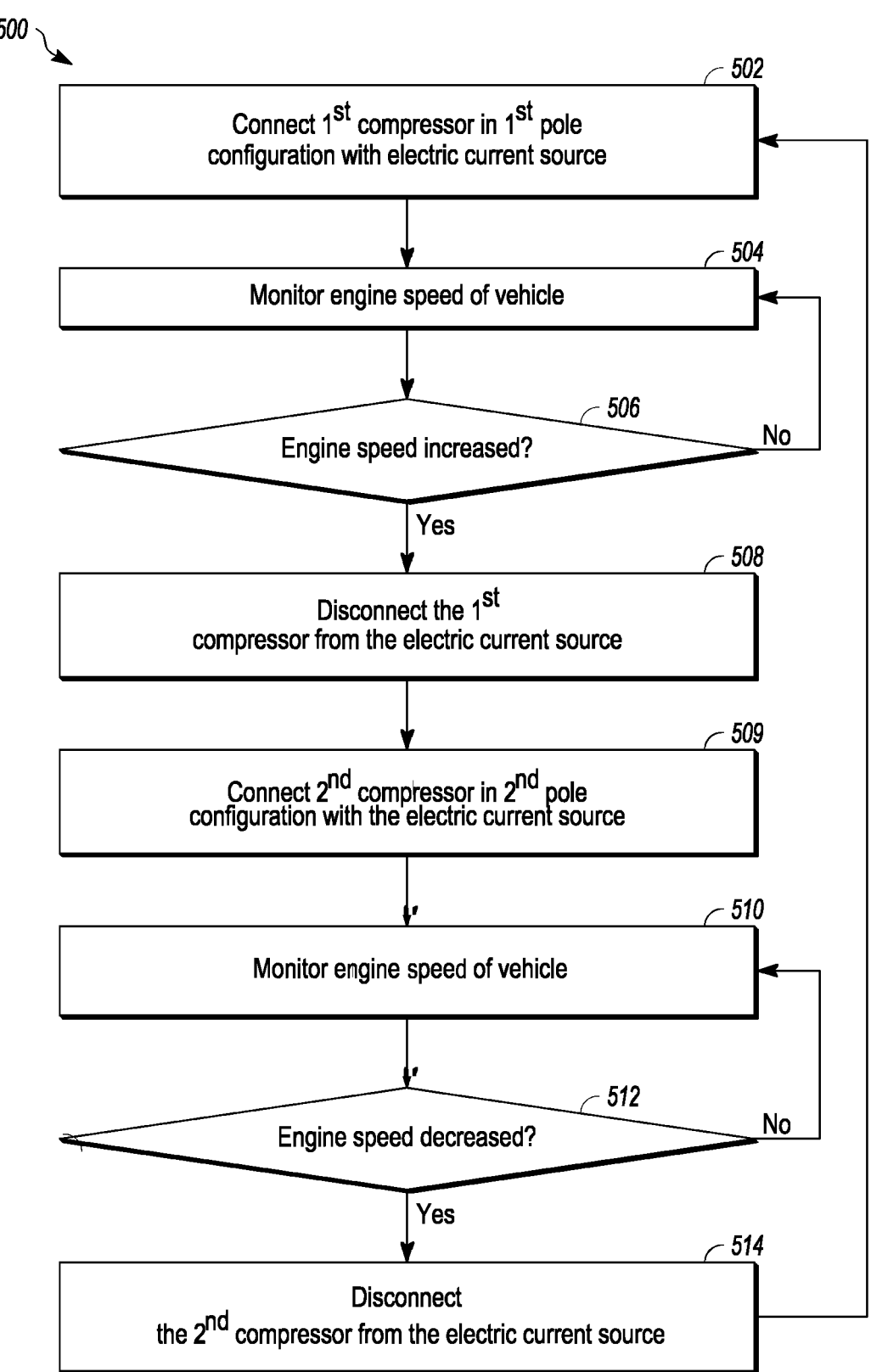
FIG. 5 is a flow chart of a method for controlling compressors of a multi-compressor assembly according to an embodiment.

FIG. 5 is a flow chart 500 of a method for controlling compressors of a multi-compressor assembly according to an embodiment. The multi-compressor assembly includes at least two compressors, and may be the multi-compressor assembly shown in FIG. 1. The method may be performed in whole or at least in part by the controller of the compressor control system shown in FIG. 1. The method in FIG. 5 optionally may be combined with the method for changing a pressure threshold described in FIG. 2 and/or the method described in FIG. 3. The method controls the compressors based on an operational state of a vehicle on which the multi-compressor assembly is located. The operational state in FIG. 5 is engine speed of an engine which produces power to propel the vehicle.

At step 502, a first compressor in the multi-compressor assembly is connected with an electric current source to power the first compressor to increase a gas pressure in a brake system of the vehicle. The first compressor is connected in a first pole configuration. The first pole configuration indicates which poles of the first compressor are connected to the electric current source. In an embodiment, each compressor has at least two different pole configurations. In a first pole configuration, a first group of the poles of the first compressor is connected to the electric current source. In a second pole configuration, a second group of the poles of the first compressor is connected to the electric current source. The poles in the second group may be separate and discrete from the poles in the first group. The controller may connect the first compressor in the first pole configuration by selectively actuating a first set of contactors.

At step 504, the engine speed of the engine of the vehicle is monitored. For example, the controller may monitor the engine speed based on sensor data generated by one or more sensors that measure engine speed. At step 506, it is determined whether the engine speed has increased. The controller may compare the current engine speed to the engine speed at an earlier time and/or to a reference engine speed. If the current engine speed is greater than the earlier speed and/or the reference speed, then the controller determines that the engine speed has increased. In response, flow continues to step 508. If the engine speed has not increased, then flow returns to step 504 to continue monitoring the engine speed.

At step 508, the first compressor is disconnected from the electric current source. The controller may disconnect the first compressor by actuating the first set of contactors such that the first compressor is no longer powered by the electric current source. At step 509, a second compressor in the multi-compressor assembly is connected with the electric current source to power the second compressor to increase the gas pressure in the brake system of the vehicle. The second compressor is connected in a second pole configuration of poles of the second compressor. The second pole configuration may be different than the first pole configuration in which the first compressor was connected to the electric current source. The controller may connect the second compressor by selectively actuating a second set of contactors. At this stage, only the second compressor is powered by the electric current source. At step 510, the engine speed of the engine of the vehicle is monitored by the controller.

At step 512, it is determined whether the engine speed has decreased. The controller may compare the current engine speed to the engine speed at an earlier time and/or to the reference engine speed. If the current engine speed is less than the earlier speed and/or the reference speed, then the controller determines that the engine speed has decreased. In response, flow continues to step 514. If the engine speed has not decreased, then flow returns to step 510 to continue monitoring the engine speed. At step 514, the controller disconnects the second compressor from the electric current source. The controller may disconnect the second compressor by actuating the second set of contactors to block power transfer from the electric current source to the second compressor. After the second compressor is disconnected, the flow may return to step 502, in which the first compressor is once again connected to the electric current source in the first pole configuration. Switching between two or more compressors in different pole configurations based on the operational state of the vehicle on which the multi-compressor assembly is located may conserve the life of the compressors.

Figure 6:
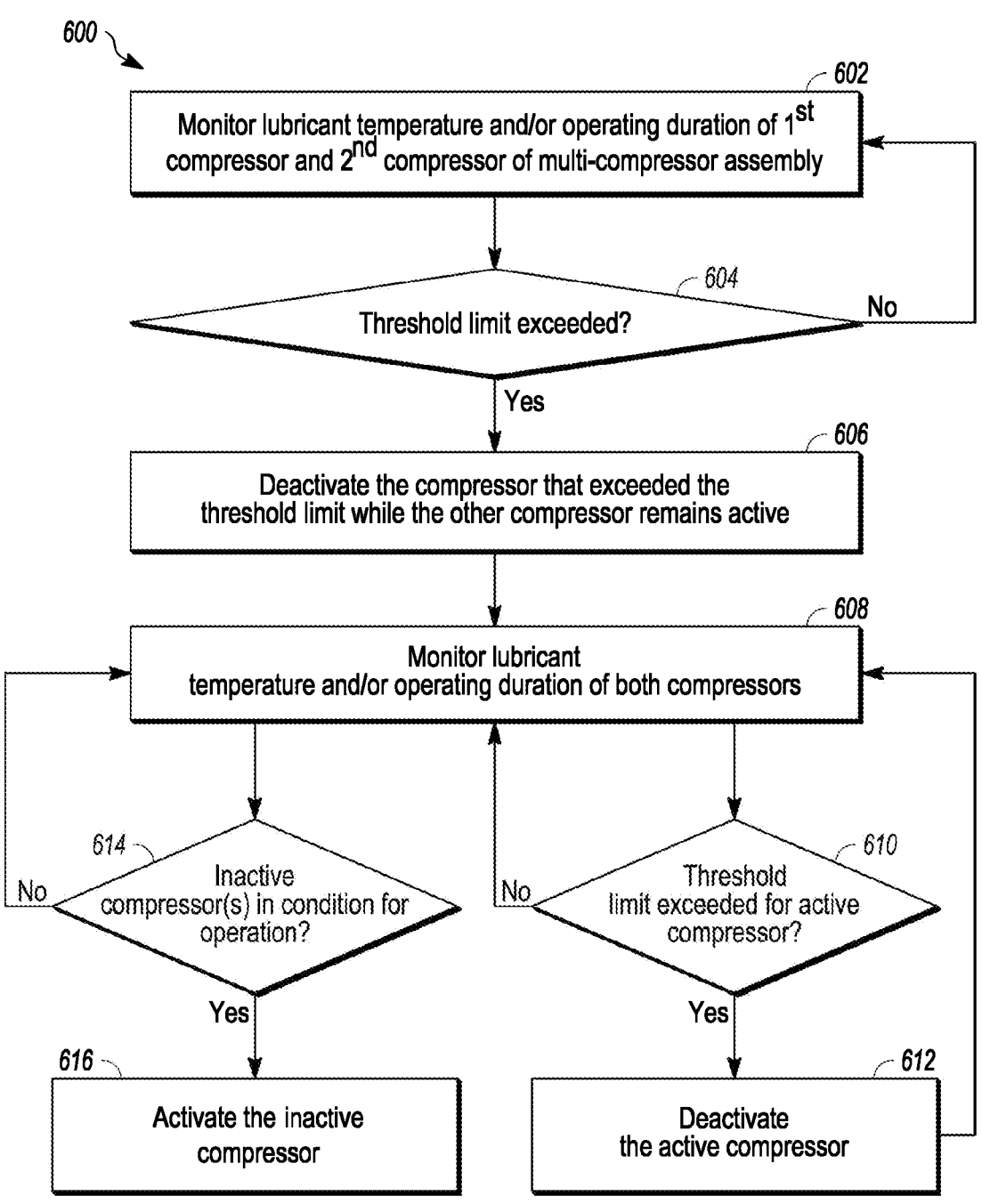
FIG. 6 is a flow chart of a method for controlling compressors of a multi-compressor assembly according to an embodiment.

FIG. 6 is a flow chart 600 of a method for controlling compressors of a multi-compressor assembly according to an embodiment. The multi-compressor assembly includes at least two compressors, and may be the multi-compressor assembly shown in FIG. 1. The method may be performed in whole or at least in part by the controller of the compressor control system shown in FIG. 1. The method in FIG. 6 optionally may be combined with any of the methods described in FIGS. 2, 3, and 5. The method controls the compressors based on a lubricant temperature and/or an operating duration of the compressors.

At step 602, a lubricant temperature and/or an operating duration of a first compressor and of a second compressor in the multi-compressor assembly are monitored over time. The compressors may be oil-based compressors, such that the lubricant may be oil. In an embodiment, the compressors are oil screw compressors. At step 604, is it determined whether a threshold limit is exceeded. The threshold limit of the lubricant temperature may be an upper temperature threshold of a designated acceptable range of lubricant operating temperatures. At least one sensor may be a temperature sensor that measures the lubricant temperature in each of the compressors. The threshold limit of the operating duration may be a time-out limit, as described above with reference to FIG. 3. The activation of each compressor may trigger a timer that monitors the operating duration of the respective compressor during the current loading cycle. The threshold limits may be non-zero thresholds.

If the controller determines that the first compressor or the second compressor has exceeded the threshold limit for lubricant temperature or operating duration, then flow proceeds to step 606. At step 606, the controller deactivates the compressor that exceeded one of the threshold limits. For example, if the first compressor exceeded one of the threshold limits, but the second compressor did not exceed any threshold limit, then the controller deactivates the first compressor. The controller allows the second compressor to remain active and supplying gas to the brake system of the vehicle. If no compressor has exceeded one of the threshold limits, then the flow returns to step 602 to continue monitoring the lubricant temperature and operating durations.

At step 608, the controller monitors the lubricant temperature and/or operating duration of both compressors, including the one that is active and the one that is inactive (deactivated). For this description, the first compressor is deactivated and the second compressor remains active. At step 610, the controller determines if the active, second compressor has exceeded either of the threshold limits. If not, then the controller continues monitoring at step 608. If the controller determines that the second compressor has indeed exceeded one of the threshold limits, then flow continues to step 612 and the controller deactivates the second compressor. After step 612, both compressors may be inactive. Flow may return to step 608 to continue monitoring the inactive compressors.

At step 614, the controller determines whether the inactive compressor(s) are in condition for operation. For example, after exceeding the time-out period, the controller may require that the compressor remain deactivated/inactive for at least a designated period of time and/or number of loading cycles. Once the designated period of time and/or number of loading cycles has occurred, then the compressor is in condition for operation. In another example, if the first compressor exceeded the upper temperature threshold of the lubricant, then the controller may allow the first compressor to operate again after a designated period of time or number of cycles, and/or after the temperature of the lubricant in the first compressor falls below a temperature threshold and/or within the acceptable range of lubricant operating temperatures. Once that occurs, the controller designates the first compressor as being in condition for operation again. If no inactive compressor is determined to be in condition for operation, then the flow returns to step 608 and the controller continues to monitor. If the first compressor is determined to be in condition for operation, then flow continues to step 616 and the first compressor is activated. At 616, the inactive compressor is activated if it is determined to be in condition for operation. The inactive compressor may be any compressor. For example, the second compressor is activated if the second compressor is inactive and determined to be in condition for operation at step 614. This control process selects which compressor to operate based on operating duration and/or lubricant temperature, in order to avoid damage and/or excessive wear caused by an uneven workload and/or excessive lubricant temperatures.

Figure 7:
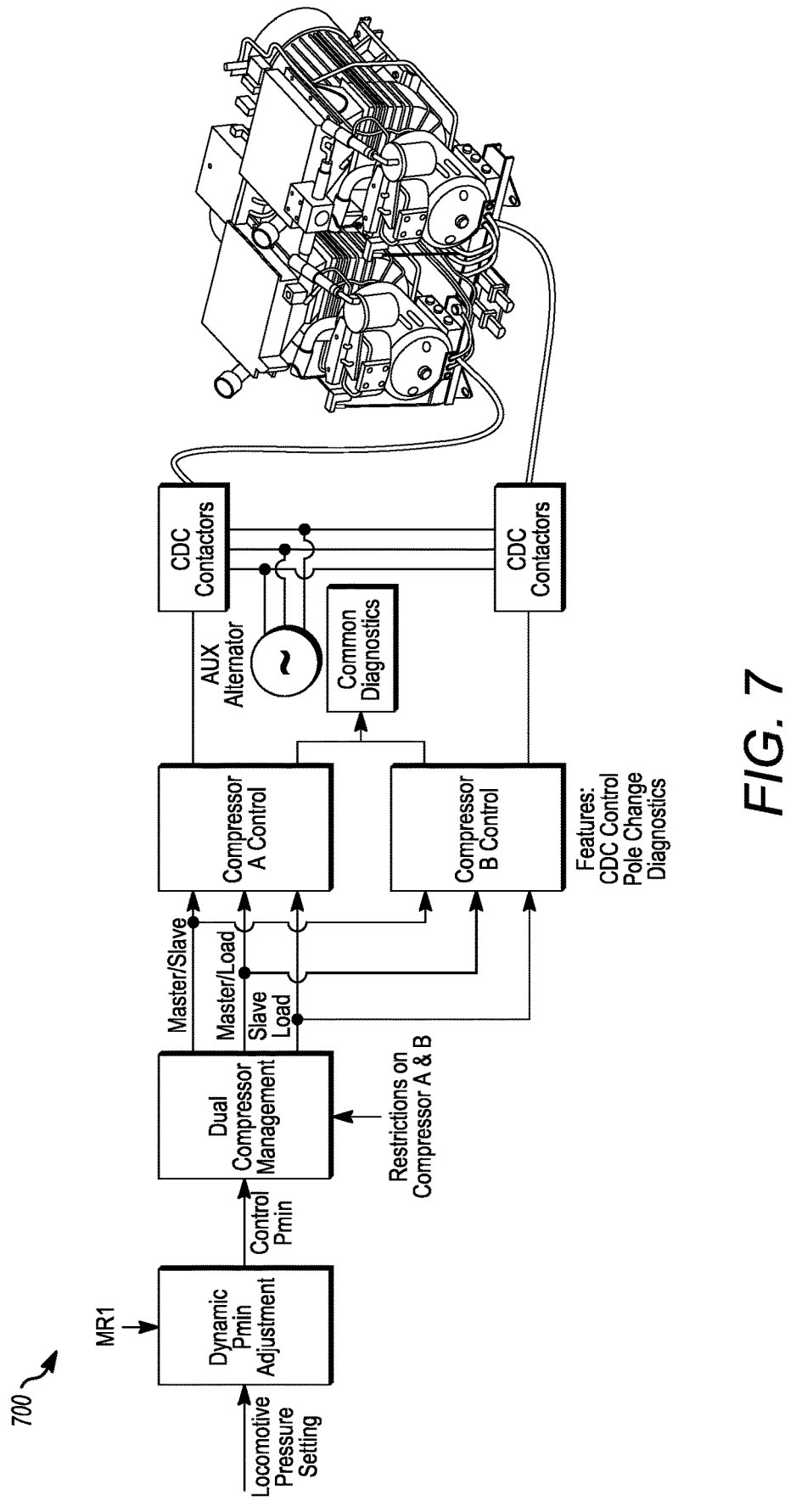
FIG. 7 is a diagram showing a multi-compressor assembly according to an embodiment.

FIG. 7 is a diagram showing a multi-compressor assembly 700 according to an embodiment. One or more of the methods described herein may be performed using the illustrated multi-compressor assembly. Compressors A and B are mentioned in FIG. 7, although the multi-compressor assembly may include more than two compressors.

In an embodiment, a method may include determining a leak rate of a brake system of a vehicle, and changing a pressure threshold at which one or more compressors are activated to supply gas to the brake system based on the leak rate. The method may include activating at least one of the one or more compressors to increase a gas pressure of the brake system based on the gas pressure of the brake system falling below the pressure threshold that is changed.

Optionally, changing the pressure threshold may include increasing the pressure threshold as the leak rate increases. Changing the pressure threshold may include decreasing the pressure threshold as the leak rate decreases. Optionally, the one or more compressors may include first and second screw compressors each having a respective unloader valve, and deactivating the first compressor or the second compressor may include opening its respective unloader valve.

In an embodiment, a system includes a controller that may determine a leak rate of a brake system of a vehicle. The controller may change a pressure threshold at which one or more compressors are activated to supply gas to the brake system based on the leak rate. The controller may activate at least one of the one or more compressors to increase a gas pressure of the brake system based on the gas pressure of the brake system falling below the pressure threshold that is changed.

Optionally, the controller may change the pressure threshold by increasing the pressure threshold responsive to the leak rate increasing. The controller may change the pressure threshold by decreasing the pressure threshold responsive to the leak rate decreasing. The one or more compressors may include first and second screw compressors each having a respective unloader valve, and deactivating the first compressor or the second compressor may include opening its respective unloader valve.

In an embodiment, a method may include monitoring a pressure of a brake system in a vehicle, and activating a first compressor of the brake system responsive to the pressure of the brake system falling below a lower pressure threshold. The method may include monitoring the pressure of the brake system after activating the first compressor, and activating at least a second compressor of the brake system responsive to the first compressor reaching a decreased operational state. The method may include monitoring the pressure of the brake system while both the first compressor and the at least the second compressor are active, and unloading at least one of the first compressor or the at least the second compressor responsive to the pressure of the brake system reaching an upper pressure threshold.

The first compressor may reach the decreased operational state responsive to the pressure of the brake system decreasing while the first compressor is active. Optionally, the first compressor may reach the decreased operational state responsive to the pressure of the brake system not reaching the upper pressure threshold within a designated, non-instantaneous period of time while only the first compressor is active. The first compressor may reach the decreased operational state responsive to the first compressor being continually active for a designated, non-instantaneous period of time. The at least the second compressor of the brake system may be activated while the first compressor remains active. The first compressor and the at least the second compressor may be concurrently unloaded in response to the pressure of the brake system reaching the upper pressure threshold. Optionally, the first compressor may be unloaded while the at least the second compressor remains active responsive to the pressure of the brake system increasing but not yet reaching the upper pressure threshold. Optionally, the first and second compressors may be first and second screw compressors that each have a respective unloader valve, and deactivating the first compressor or the second compressor may include opening its respective unloader valve.

In an embodiment, a system may include a multi-compressor assembly and a controller. The multi-compressor assembly may be configured to increase a pressure of a brake system in a vehicle. The multi-compressor assembly includes a first compressor and at least a second compressor. The controller may monitor the pressure of the brake system, and may activate the first compressor of the multi-compressor assembly responsive to the pressure of the brake system falling below a lower pressure threshold. The controller may continue monitoring the pressure of the brake system after activating the first compressor, and may activate the at least the second compressor of the brake system responsive to the first compressor reaching a decreased operational state. The controller may continue monitoring the pressure of the brake system while both the first compressor and the at least the second compressor are active, and may unload at least one of the first compressor or the at least the second compressor responsive to the pressure of the brake system reaching an upper pressure threshold.

Optionally, the controller may determine that the first compressor reached the decreased operational state responsive to the pressure of the brake system decreasing while the first compressor is active. Optionally, the controller may determine that the first compressor reached the decreased operational state responsive to the pressure of the brake system not reaching the upper pressure threshold within a designated, non-instantaneous period of time while only the first compressor is active. The controller may determine that the first compressor reached the decreased operational state responsive to the first compressor being continually active for a designated, non-instantaneous period of time. The controller may activate the at least the second compressor of the brake system while the first compressor remains active. The controller may concurrently unload the first compressor and the at least the second compressor responsive to the pressure of the brake system reaching the upper pressure threshold. The controller may unload the first compressor while the at least the second compressor remains active responsive to the pressure of the brake system increasing but not yet reaching the upper pressure threshold. Optionally, the first and second compressors may be first and second screw compressors that each have a respective unloader valve, and deactivating the first compressor or the second compressor may include opening its respective unloader valve.

In an embodiment, a system includes a multi-compressor assembly and a controller. The multi-compressor assembly may have a first compressor and a second compressor configured to be coupled with a brake system of a vehicle. The multi-compressor assembly may include a first contactor set that controls contact between different groups of first poles of the first compressor and at least a first source of electric current that powers the first compressor. The multi-compressor assembly may include a second contactor set that controls contact between different groups of second poles of the second compressor and at least the first source of electric current that powers the second compressor. The controller may control the first contactor set and the second contactor set to change which of the groups of the first poles of the first compressor and which of the groups of the second poles of the second compressor are connected with the at least the first source of electric current based on an operational state of the vehicle.

Optionally, the controller may change which of the groups of the first poles of the first compressor and which of the groups of the second poles of the second compressor are connected with the at least the first source of electric current based on an engine speed of the vehicle as the operational state of the vehicle. The controller may disconnect a first group of the first poles of the first compressor from the at least the first source of electric current and connect a second group of the second poles of the second compressor with the at least the first source of electric current responsive to the engine speed increasing. The controller may reconnect the first group of the first poles of the first compressor with the at least the first source and disconnect the second group of the second poles of the second compressor from the at least the first source responsive to the engine speed decreasing. Optionally, the first and second compressors may be first and second screw compressors that each have a respective unloader valve, and deactivating the first compressor or the second compressor may include opening its respective unloader valve.

In an embodiment, a method includes connecting a first group of first poles of a first compressor in a multi-compressor assembly with a first source of electric current to power the first compressor to increase a gas pressure in a brake system of a vehicle. The method may include monitoring an operational state of the vehicle, and connecting a second group of second poles of a second compressor in the multi-compressor assembly with the first source of electric current to power the second compressor to increase the gas pressure in the brake system of the vehicle based on a change in the operational state of the vehicle.

Optionally, the operational state of the vehicle is an engine speed. The second group of the second poles of the second compressor may be connected with the first source of electric current, and the first group of the first poles of the first compressor may be disconnected from the first source, responsive to the engine speed increasing. Optionally, the method includes disconnecting the second group of the second poles of the second compressor responsive to the engine speed decreasing. Optionally, the first and second compressors may be first and second screw compressors that each have a respective unloader valve, and deactivating the first compressor or the second compressor may include opening its respective unloader valve.

In an embodiment, a method includes monitoring one or more of a lubricant temperature or an operating duration of a first compressor and of a second compressor in a multi-compressor assembly of a vehicle. The method may include deactivating the first compressor or the second compressor responsive to the one or more of the lubricant temperature or the operating duration of the first compressor or the second compressor exceeding an associated non-zero threshold while another of the first compressor or the second compressor remains active.

Optionally, the method may include continuing to monitor the one or more of the lubricant temperature or the operating duration of the first compressor or the second compressor that remains active. The method may include deactivating the first compressor or the second compressor that remained active responsive to the one or more of the lubricant temperature or the operating duration of the first compressor or the second compressor exceeding the non-zero threshold, and activating the first compressor or the second compressor that was deactivated.

In an embodiment, a system includes controller that monitors one or more of a lubricant temperature or an operating duration of a first compressor and of a second compressor in a multi-compressor assembly of a vehicle. The controller may deactivate the first compressor or the second compressor responsive to the one or more of the lubricant temperature or the operating duration of the first compressor or the second compressor exceeding an associated non-zero threshold while another of the first compressor or the second compressor remains active.

Optionally, the controller may continue monitoring the one or more of the lubricant temperature or the operating duration of the first compressor or the second compressor that remains active. The controller may deactivate the first compressor or the second compressor that remained active responsive to the one or more of the lubricant temperature or the operating duration of the first compressor or the second compressor exceeding the non-zero threshold. The controller may activate the first compressor or the second compressor that was deactivated. Optionally, the first and second compressors may be first and second screw compressors that each have a respective unloader valve, and deactivating the first compressor or the second compressor may include opening its respective unloader valve.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A system comprising:
a controller configured to determine a leak rate of a brake system of a vehicle, the controller also configured to change a pressure threshold at which one or more compressors are activated to supply gas to the brake system based on the leak rate, the controller configured to activate at least a first compressor of the one or more compressors to increase a gas pressure of the brake system based on the gas pressure of the brake system and the pressure threshold that is changed.

2. The system of claim 1, wherein the controller is configured to change the pressure threshold by increasing the pressure threshold responsive to the leak rate increasing.

3. The system of claim 1, wherein the controller is configured to change the pressure threshold by decreasing the pressure threshold responsive to the leak rate decreasing.

4. The system of claim 1, wherein the first compressor is a screw compressor that has an unloader valve.

5. The system of claim 1, wherein the controller is configured to monitor the gas pressure of the brake system after activating the first compressor, and to activate a second compressor in response to the first compressor reaching a decreased operational state.

6. The system of claim 5, wherein the controller is configured to monitor the gas pressure of the brake system while both the first compressor and the second compressor are active, and to unload at least one of the first compressor or the second compressor in response to the gas pressure reaching an upper pressure threshold.

7. A system comprising:

a controller configured to:

determine a leak rate of a brake system of a vehicle;

change a first pressure threshold to a second pressure threshold at which one or more compressors are activated to supply gas to the brake system based on the leak rate;

determine whether pressure of the brake system is less than the second pressure threshold; and based on the pressure in the brake system and the second pressure threshold, activate at least a first compressor of the one or more compressors to increase the pressure of the brake system.

8. The system of claim 7, wherein the controller is configured to compare a first pressure to a second pressure in the brake system relative to a period of time between measuring the first pressure and the second pressure.

9. The system of claim 8, wherein the controller is configured to:

compare the leak rate to a previous leak rate; and determine the leak rate is increasing based on the leak rate being greater than the previous leak rate.

10. The system of claim 9, wherein the second pressure threshold is greater than the first pressure threshold.

11. The system of claim 7, wherein the controller is configured to:

compare the leak rate to a previous leak rate; and determine the leak rate is decreasing based on the leak rate being less than the previous leak rate.

12. The system of claim 11, wherein the second pressure threshold is less than the first pressure threshold.

13. The system of claim 7, wherein the second pressure threshold is based on second leak rate.

14. A system comprising:

a brake system;

a compressor assembly comprising a first compressor;

a sensor to monitor pressure in the brake system; and a controller configured to:

determine a leak rate of the brake system of a vehicle;

change a first pressure threshold to a second pressure threshold at which one or more compressors are activated to supply gas to the brake system based on the leak rate;

determine whether pressure in the brake system is less than the second pressure threshold; and based on the pressure in the brake system and the second pressure threshold, activate at least the first compressor of the one or more compressors to increase a gas pressure of the brake system.

15. The system of claim 14, wherein the controller is configured to compare a first pressure to a second pressure in the brake system relative to a period of time between measuring the first pressure and the second pressure.

16. The system of claim 15, wherein the controller is configured to:

compare the leak rate to a previous leak rate; and determine the leak rate is increasing based on the leak rate being greater than the previous leak rate.

17. The system of claim 16, wherein the second pressure threshold is greater than the first pressure threshold.

18. The system of claim 15, wherein the controller is configured to:

compare the leak rate to a previous leak rate; and determine the leak rate is decreasing based on the leak rate being less than the previous leak rate.

19. The system of claim 18, wherein the second pressure threshold is less than the first pressure threshold.

20. The system of claim 14, wherein the second pressure threshold is based on second leak rate.

* * * * *